3,431,201
HYPERFILTRATION PROCESS HAVING ION EXCHANGE PRETREATMENT
James S. Johnson and Kurt A. Kraus, Oak Ridge, Tenn., assignors to the United States of America as represented by the United States Atomic Energy Commission
No Drawing. Filed Aug. 29, 1967, Ser. No. 664,207
U.S. Cl. 210—23
Int. Cl. C02b 1/58; B01d 13/00
5 Claims

ABSTRACT OF THE DISCLOSURE

In a method of carrying out a hyperfiltration process for removing solute from an aqueous solution using a dynamically formed ion exchange membrane the improvement comprising using a hydrous oxide mass as an ion exchanger to remove interfering ions such as fluoride, phosphate, sulfate, and silicate from the solution before the solution is brought into contact with the membrane.

Background of the invention

The invention described herein was made in the course of, or under, a contract with the United States Atomic Energy Commission and in the course of work sponsored by the Office of Saline Water of the United States Department of the Interior.

Our invention relates in general to hyperfiltration methods of removing solutes from aqueous solutions and more particularly to such methods using solute-rejecting membranes dynamically established on a porous substrate.

Solute-rejecting membranes are dynamically formed when an aqueous phase containing at least one of a wide variety of additives, as exemplified by neutral organic polymers, polyelectrolytes, organic ion exchangers, inorganic ion exchangers, and hydrous oxides, is passed through and past a porous substrate. When an aqueous solution is forced over the surface of the resulting porous substrate under conditions whereby a portion of the solution passes through it, the membrane rejects solute and the portion passing through the pores is depleted in solute. Details of methods of making and using these dynamic membranes are disclosed in copending, coassigned application Ser. No. 504,277, filed Oct. 23, 1965, now abandoned, for "A Method of Separating Salts from Aqueous Solutions."

With ion exchange membranes we have discovered that the presence of polyvalent counter-ions (ions having a charge sign opposite that of the fixed charge on the exchanger) and occasionally certain monovalent counter-ions which strongly interact with the exchanger sites (e.g., fluoride with some hydrous oxides) frequently adversely affect the solute rejection of the membrane. For the most economical operation of a hyperfiltration process it is necessary to prevent loss of rejection capability of a membrane.

Summary of the invention

It is accordingly one object of our invention to provide a method of increasing the lifetime of a dynamic membrane used in a hyperfiltration process.

It is another object to provide an improved method of removing interfering ions from hyperfiltration feed solutions.

Other objects of our invention will become apparent from the following description and claims.

We have provided an improvement in a hyperfiltration process for reducing the concentration of solute in an aqueous solution comprising forcing said solution past a dynamically formed ion exchange membrane under conditions whereby a portion of said solution flows through said membrane and is depleted in solute, said improvement comprising the step of contacting said solution with a hydrous metal oxide mass prior to forcing it past said membrane, said contact being made under conditions whereby ions are exchanged between said hydrous metal oxide mass and said solution.

Ions which are most deleterious to the dynamically formed membranes such as fluoride and polyvalent counter-ions such as phosphate, sulfate, and silicate are most strongly bound to hydrous oxides and are thus removed from the feed solution efficiently and preferentially by incorporating our step in a hyperfiltration process. Our step not only removes the interfering ions, thus increasing the useful life of the membrane but also provides a method for (1) controlling the pH of the feed solution and (2) adding membrane-forming material to it.

Description of the preferred embodiments

In carrying out our invention the aqueous feed solution is contacted with a hydrous metal oxide ion exchange mass. The hydrous metal oxides are well-known ion exchange materials and any of the hydrous oxides capable of being formed from polyvalent metal salts may be used. Typically useful hydrous oxides are thus formed from zirconium, ferric, and thorium salts. In the preferred method of carrying out our invention the dynamic membrane comprises a hydrous metal oxide and the same hydrous metal oxide is used as the ion exchange mass. This preferred method not only removes interfering ions, but also introduces material into the solution which is capable of forming and maintaining a rejecting membrane.

Contact between the hydrous metal oxide mass and the feed solution may be effected in any method capable of taking advantage of the ion exchange properties of the hydrous metal oxide and conventional ion exchange techniques such as passing the feed solution through a column of hydrous metal oxide particles are suitable.

The hydrous metal oxide mass which becomes loaded with interfering ions may be regenerated by contacting the mass with an acid, a base, or both in consecutive steps. These steps not only regenerate the ion exchanger, but also provide a method of adjusting the pH of the next cycle of feed solution to an optimum value for rejection of solute. The optimum value will depend on whether it is desired to use the hydrous oxide in its anion or cation exchange form and will be substantially removed from the isoelectric point of the hydrous oxide in order to provide sufficient capacity in the exchanger. Reference is made to U.S. Patent No. 3,332,737 issued July 25, 1967, in the name of Kurt A. Kraus for "Process for Separating Inorganic Anions with Hydrous Oxide Anion Exchangers" for a discussion of factors governing pH selection when using hydrous oxides as ion exchangers.

Having thus described our invention, the following examples are offered to illustrate it in more detail. Example I shows the effect of the presence of silicate on the hyperfiltration properties of a dynamic membrane; Example II shows the effect of modifying the feed solution pH on the rejection properties of the membrane; and Example III shows the effect of simultaneously changing the pH of the feed solution to a value within the acid range and removing silicate from the aqueous solution prior to its contact with the dynamic membrane.

Example I

A simulated brackish water (pH 7.5) containing 0.0022 molar $CaCl_2$, 0.0022 molar $MgCl_2$, 0.0055 molar $NaHCO_3$, and 0.087 molar NaCl together with 35 parts per million silicate and $10^{-4}$ molar hydrous Zr(IV) oxide additive was circulated through a hyperfiltration cell containing a dynamically deposited hydrous zirconium oxide membrane. This membrane had been formed by exposing a polyvinyl chloride film containing 0.45 micron nominal pores to a feed containing $10^{-3}$ molar collodal hydrous Zr(IV) oxide. The solute rejection was negligible.

Example II

The feed solution of Example I was acidified to a pH of 3 and was then circulated through the same cell having a hydrous zirconium oxide membrane. The chloride rejection of the membrane was 35 percent.

Example II illustrates the beneficial effect of modifying the pH of the feed solution to increase the anion exchange properties of the dynamic membrane.

Example III

In a run using the same solution of Example I and the same membrane, the aqueous feed solution was passed through an ion exchange column containing zirconium oxide in the acid form. The effluent from the column, depleted in silicate and at a pH 3.5, was fed to the hyperfiltration cell of Example I containing the same dynamically deposited membrane. At a pressure of 500 p.s.i. the solute rejection rate was about 50 percent and the transmission rate was about 100 gal./ft.$^2$/day.

As can be seen from Example III, a step of contacting a feed solution with a hydrous metal oxide mass is effective in improving the solute rejection capabilities of a dynamically formed ion exchange membrane.

The foregoing examples are intended to illustrate, not to limit, our invention. It is obvious that changes may be made in the chemical composition of either or both the hydrous oxide mass and the membrane, Not only silicate, but other ions which are strongly bound to ion exchange sites, and are thus deleterious to solute-rejecting membranes, will be removed by our method. The pH of the feed solution can be adjusted to desirable levels by adjusting the acidity of the hydrous oxide mass. It is also possible to remove interfering cations from the feed solution by adjusting the pH of the hydrous oxide mass to a value where it acts as a cation exchanger.

We claim:

1. In a hyperfiltration process for reducing the concentration of solute in an aqueous solution comprising forcing said solution past a dynamically formed ion exchange membrane under conditions whereby a portion of said solution flows through said membrane and is depleted in solute, the improvement comprising the step of contacting said solution with a hydrous metal oxide mass prior to forcing it past said membrane, said contact being made under conditions whereby ions are exchanged between said hydrous metal oxide mass and said solution.

2. The method of claim 1 wherein said hydrous metal oxide mass removes ions selected from the group consisting of fluoride, phosphate sulfate, and silicate from said solution.

3. The method of claim 1 wherein said ion exchange membrane is a hydrous metal oxide.

4. The method of claim 1 wherein said ion exchange membrane is a hydrous metal oxide having the same chemical composition as the hydrous metal oxide mass.

5. The method of claim 1 wherein said hydrous metal oxide mass is in an acid form.

References Cited

UNITED STATES PATENTS

| 3,331,772 | 7/1967 | Brownscombe et al. | 210—23 |
| 3,332,737 | 7/1967 | Kraus | 210—24 X |
| 3,344,925 | 10/1967 | Kraus et al. | 210—500 |
| 3,382,034 | 5/1968 | Kraus | 210—24 X |

REUBEN FRIEDMAN, *Primary Examiner.*

F. A. SPEAR, JR., *Assistant Examiner.*

U.S. Cl. X.R.

210—37